United States Patent Office 3,834,985
Patented Sept. 10, 1974

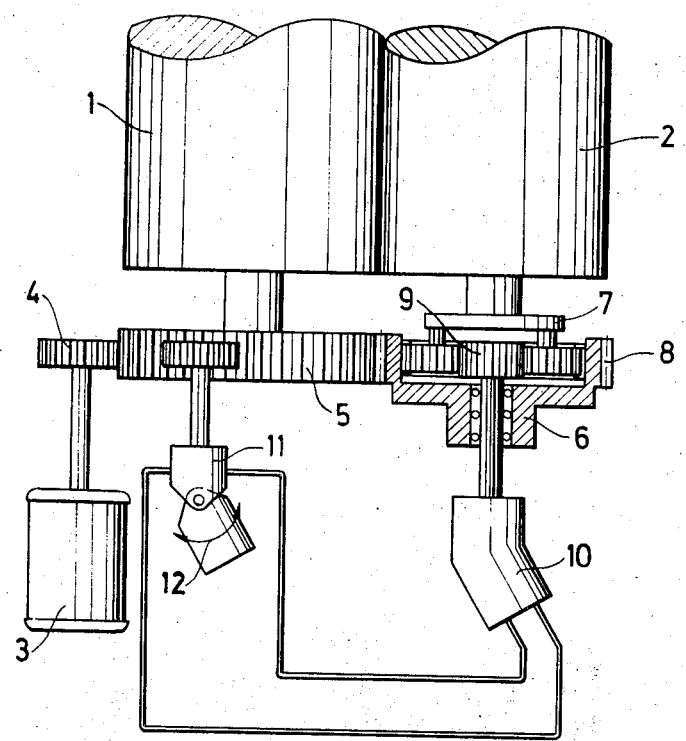

3,834,985
SPEED REGULATING DEVICE INCLUDING PLANETARY GEARING AND A HYDRAULIC UNIT OR VARIABLE VOLUME
Lars Gullberg, Vasa, Finland, assignor to Oy Wartsila Ab, Helsinki, Finland
Filed Nov. 28, 1972, Ser. No. 310,078
Claims priority, application Finland, Nov. 30, 1971, 3,412/71
Int. Cl. D21g 9/00; F16h 47/04
U.S. Cl. 162—280                         6 Claims

ABSTRACT OF THE DISCLOSURE

A device for use in regulating the difference in speeds between two rotating elements, for instance a pair of rolls forming a crepe nip in a papermaking machine, includes a planetary gearing connected to one of the rotating elements so that a member carrying the planet wheels of the gearing rotates at a speed which has a constant ratio with respect to the rotating speed of the rotating element. In the planetary gearing there is a toothed annulus engaging and surrounding the planet wheels, and this annulus is arranged to rotate at a constant speed ratio with respect to the other one of the rotating elements. A hydraulic pump and motor arrangement is connected to the device so that the flow produced by the pump is dependent on the rotating speed of the last mentioned rotating element, and so that the motor determines the speed of the sun wheel of the planetary gearing. The rotating speed of the sun wheel can be regulated by changing the piston displacement volume in either the pump or the motor, or in both of them. Changes in the speed of the sun wheel cause corresponding changes in the speed of the rotating element connected to the planet wheel carrier.

---

The invention relates to a device for regulating the difference in speeds between two rotating elements, which are connected to each other by means of a transmission with a variable transmission ratio.

As an example of an arrangement which can advantageously be provided with a device according to the invention, there may be mention, a pair of rolls forming a crepe nip in a paper making machine. In a crepe nip, the speed of the rotating rolls is regulated so that the two rolls forming the nip have slightly different surface speeds whereby the desired creping action is obtained. This speed difference must be controllable with great accuracy. Known control means for this purpose are either very complicated and expensive or do not work with sufficient accuracy.

An object of the invention is to provide a control means which is suitable for the above mentioned purpose, which has an uncomplicated design, great reliability in service and a functional accuracy of high degree. According to the invention the foregoing is obtained by connecting a planetary gearing to one of the rotating elements, so that a member carrying the planet wheels of the gearing rotates with a speed which has a constant ratio to the rotating speed of the rotating element, and by arranging a toothed annulus engaging and surrounding the planet wheels to rotate with a constant speed ratio with respect to the other one of the rotating elements. Further, a hydraulic pump and motor arrangement is connected to the device so that the flow produced by the pump is dependent on the rotating speed of the last mentioned rotating element, and so that the motor determines the speed of the sun wheel of the planetary gearing. Consequently, the rotating speed of the sun wheel can be regulated by changing the volume ratio of either the pump or the motor or of both of them. The expression "volume ratio" means the piston displacement volume per revolution in the pump or in the motor.

In a preferred embodiment of the invention, the planetary gearing forming a part of a device according to the invention is arranged so that the member carrying the planet wheels of the gearing is directly connected to one of the rotating elements and rotates together with this element. In this way a simple attachment and power transmission is obtained.

The annulus surrounding the planet wheels of the planetary gearing can also be advantageously provided with an external toothing which can be directly engaged with a gear wheel on the shaft of one of the rotating elements. If the rotating elements form a pair of rolls this solution is especially advantageous.

The rotating elements are connected to each other, not only through the planet wheel carrier of the planetary gearing, but also through the sun wheel of the gearing. The sun wheel is connected to a hydraulic motor driven by a pump which, in turn, is driven by one of the rotating elements. Since it is usually preferred to have the pump running at a relatively high speed, a gear or any other suitable power transmission is arranged between the pump and the rotating elements so as to give the hydraulic pump a sufficiently high speed. The hydraulic pump and motor arrangement is used to regulate the speed of the sun wheel. Changes in the speed of the sun wheel have an influence on the speed of the rotating element connected to the planet wheel carrier. Due to the characteristics of a planetary gearing this influence is very small which is of advantage because it makes it possible to obtain a high degree of control accuracy.

Since it is not necessary that both the hydraulic pump and the hydraulic motor have a variable volume ratios, one of these units preferably has a constant volume ratio. Usually only the volume ratio of the pump is variable.

In the following, the invention will be described more in detail with reference to the attached drawing which schematically illustrates an embodiment of the invention.

In the drawing, 1 and 2 indicate the rolls of a crepe nip. The rolls are driven by a motor 3 having a gear wheel 4 connected to its driving shaft. The gear wheel 4 engages another gear wheel 5 on the shaft of roll 1. A planetary gearing 6 is connected to the shaft of roll 2. A member 7 carrying the planet wheels of the gearing is rigidly connected to the shaft of roll 2 and rotates with the shaft. The radially outer side wall of the annulus surrounding the planet wheels of the planetary gearing is provided with an external toothing 8 which engages the gear wheels located on the shaft of roll 1. The diameters of the pitch circles of the gear wheel 5 and annulus 8 are the same as the diameters of the corresponding rolls 1 and 2, respectively.

The sun wheel 9 of the planetary gearing is attached to a shaft which is driven by a hydraulic motor 10. The motor 10 receives its power from a hydraulic pump 11 having a variable volume ratio symbolically indicated by means of an arrow 12. The pump 11 is, in the shown embodiment, driven by the gear wheel 5, but it should be understood that the pump 11 can be driven also in any other suitable way, for instance, by being directly connected to the driving motor 3.

Through changing the volume ratio of the pump 11, the flow fed from the pump to the motor 10 is varied, and this causes a change in the speed of the sun wheel 9 of the planetary gearing. This, in turn, influences through the intermediary of the planetary gearing, the speed of the roll 2.

The invention is not limited to the embodiment shown but several modifications are feasible within the scope of the following claims.

I claim:
1. A speed regulating device for regulating the difference in speeds between two rotating elements, said device comprising; a primary driving shaft; and a transmission with a variable transmission ratio, said transmission being connected to said primary driving shaft and to said two rotating elements, said transmission including a planetary gearing, and a hydraulic pump and motor arrangement, said planetary gearing having a planet wheel carrier adapted to rotate with a speed having a constant ratio with respect to the rotational speed of one of said rotating elements, a toothed annulus engaging and surrounding said planet wheels adapted to rotate with a constant speed ratio with respect to the other one of said rotating elements, a constant ratio transmission connecting the pump of said hydraulic pump and motor arrangement to said other rotating element, the motor of said pump and motor arrangement being driven by the flow of said pump and being connected to drive a sun wheel of said planetary gearing, said pump and motor arrangement having at least one hydraulic unit of a variable volume ratio and including means for effecting control of the speed of said sun wheel by adjustment of said volume ratio.

2. A device according to claim 1 in which the speed ratio between said planet wheel carrier and said first mentioned rotating element is 1:1.

3. A device according to claim 2 in which said planet wheel carrier is directly connected to said first mentioned rotating element.

4. A device according to claim 1 in which said rotating elements are a pair of rolls forming a crepe nip.

5. A device according to claim 4 in which a toothed annulus engaging and surrounding the planet wheels of said planetary gearing is provided with an external toothing which engages a gear wheel on the shaft of the rotating element remote from said planetary gearing.

6. A device according to claim 1 in which only one of the units of the pump and motor arrangement has a variable volume ratio.

References Cited
UNITED STATES PATENTS

| | | | |
|---|---|---|---|
| 3,373,635 | 3/1968 | Meurer | 74—687 X |
| 3,013,452 | 12/1961 | Hornbostel | 74—687 X |
| 1,680,203 | 8/1928 | Cannard | 162—280 X |
| 1,582,842 | 4/1926 | Lorenz | 162—280 X |
| 3,085,448 | 4/1963 | Finlayson | 74—687 |
| 1,690,172 | 11/1928 | Lorenz | 162—280 |
| 3,220,914 | 11/1965 | Boadway et al. | 162—111 X |

S. LEON BASHORE, Primary Examiner

R. V. FISHER, Assistant Examiner

U.S. Cl. X.R.

74—687; 162—111; 425—336